Aug. 10, 1954   J. D. CONTI   2,685,769
APPARATUS FOR MAKING STUFFED PRODUCTS
Filed Nov. 30, 1950   3 Sheets-Sheet 1

INVENTOR.
JOHN D. CONTI
BY
Thomas R. O'Malley
ATTORNEY.

Aug. 10, 1954

J. D. CONTI 2,685,769

APPARATUS FOR MAKING STUFFED PRODUCTS

Filed Nov. 30, 1950

INVENTOR.
JOHN D. CONTI
BY

ATTORNEY.

Patented Aug. 10, 1954

2,685,769

UNITED STATES PATENT OFFICE 2,685,769

APPARATUS FOR MAKING STUFFED PRODUCTS

John D. Conti, Philadelphia, Pa., assignor to American Viscose Corporation, Wilmington, Del., a corporation of Delaware Application November 30, 1950, Serial No. 198,282

15 Claims. (Cl. 53—55)

This invention relates in general to making stuffed products and particularly to an apparatus for the continuous production of stuffed products, such as sausages, frankfurters, and the like.

At the present time, the usual apparatus for the manufacture of sausages consists of a large closed chamber equipped with a tube through which the sausage meat can be forced by air pressure on the meat in the chamber. In the manufacture of the "skinless" sausage, it is customary first to stuff the sausage meat in an artificial seamless casing, and then to cook and smoke the sausage and thereafter peel off the casing. In making "skinless" sausage and other small sausages, a small diameter casing having a length of several feet is shirred onto the tube or is pre-shirred and then slipped over the tube. The end of the casing is tied, and the casing is then filled with sausage meat. When manufacturing frankfurters by this method a number of separate hand operations are required, one for each individual casing, and since the length of the individual casing is limited, the interruptions of the stuffing operation are numerous and consequently production is decreased, and in addition such operation is not continuous nor is the product consistent or uniform in weight and size. However, since the length of the casing is limited by the length of the tube over which it must be shirred and the length of the natural casing is limited by the length of the animal organ from which it is obtained, the above recited interruptions cannot be avoided when employing conventional methods and apparatus.

Further, when making large-sized sausages, such as salami, bologna, and the like, large artificial seamless casings not more than about two feet in length have been heretofore employed. The stuffing of such casings is entirely a discontinuous batch operation.

It is a primary object of the present invention to provide an apparatus for the continuous production of stuffed products, such as sausage.

It is another object of the invention to provide an apparatus for the continuous production of stuffed products in tight-fitting casings of an alkali-soluble material.

Another object of the invention is to provide an apparatus for continuously stuffing a casing of alkali-soluble cellulosic material simultaneously with its formation.

Another object of the invention is to provide an apparatus for continuously producing a stuffed sausage encased in an alkali-soluble casing which is suitable for the preparation of the so-called "skinless" frankfurters.

It is still another object of the invention to provide an apparatus for the continuous production of stuffed products in tight-fitting casings of an alkali-soluble material having a uniform size and weight.

With the above recited general objects in view, and other objects and advantages which will be obvious from the following description, this invention consists in certain novel and peculiar features of construction, and the organization of cooperative parts as hereinafter disclosed and claimed. In order that the same may be clearly understood, reference should be had to the accompanying drawing which illustrates practical embodiments of the invention, and in which

In general, the objects of the present invention are accomplished by providing a continuous casing forming and stuffing apparatus comprising in combination a plastic material supply, a tube, conduit, feed line or nozzle through which the plastic material is continuously forced under pressure and extruded from the discharge terminus thereof, means for continuously shaping a flexible sheet material into a casing about the tube, means for supplying adhesive material to one of the edges of the sheet material to be overlapped before or during overlapping, means for sealing the edges of the sheet as it passes over the tube, means for continuously applying a neutralizing material to one or both sides of the seam of the casing before it leaves the end of the tube, and means for continuously maintaining the size of the stuffed products uniform.

One of the characteristic features of the present invention is that a continuous casing is stuffed under pressure so as to produce a stuffed product in a tight-fitting casing. Another feature is that the pressure applied to the plastic material, such as a sausage meat, as it is stuffed in the casing, causes or assists the passage of the casing over the tube so that while that portion of the sealed casing which extends beyond the end of the tube is being stuffed, a succeeding portion is being shaped and sealed into a casing on the tube. Thus, the operations of forming the casing and stuffing the casing are carried out simultaneously and concurrently which are then followed in continuous sequence without interruption by linking, cooking and/or smoking, cooling, stripping when desired, and packaging.

The seamed artificial casing of the present invention is formed by folding about the sausage meat feed tube a flexible sheet of an alkali-sensitive material, such as regenerated cellulose, cellulose acetate and the like, or, preferably, an alkali-soluble, water-insoluble cellulose material, such as a lower alkyl, hydroxyalkyl, or carboxyalkyl ether of cellulose, preferred specific materials being methyl, ethyl, hydroxyethyl, and carboxymethyl ethers of cellulose, mixed cellulose ethers of this class, and also sheets derived from cellulose ether-xanthate, cellulose xantho-ethers, cellulose thiourethanes and cellulose xantho fatty acids.

As a suitable adhesive for use in sealing the overlapped edges of the sheet in forming the casing, there may be employed any alkaline liquid, such as a dilute solution of caustic soda or potash. If desired, the adhesive may be an alkaline solution of one of the alkali-soluble cellulosic materials of which the casing may be made and the cellulosic material in the adhesive may be the same as or different than that of the sheet. The adhesive may be applied to one edge of the sheet before it is formed into a casing, or it may be inserted between the edges of the sheet as they are overlapped in forming the casing. If desired, a coating of the alkali-adhesive material may be applied adjacent one edge of the sheet and dried before the sheet is wound up into a roll or before it is passed into the casing-forming mechanism. In this latter case, it is merely necessary to wet the coating edge of the sheet as it proceeds to the casing-forming position before or after the edges are overlapped. Preferably, however, the adhesive material is applied to one edge of the sheet just before the sheet is formed into a casing.

After the adhesive has been applied to one edge of the sheet and the edges are overlapped, they are preferably subjected to pressure as they proceed along the tube to assure good adhesion. When certain products are to be stuffed in the casing, it is desirable to neutralize the alkali before the material is stuffed into the casing. This is accomplished by applying an acid liquid, such as acetic acid and the like, to the inside and/or the outside of the seam or seal before the sealed casing leaves the terminus of the tube.

Figures 1, 12, 13:
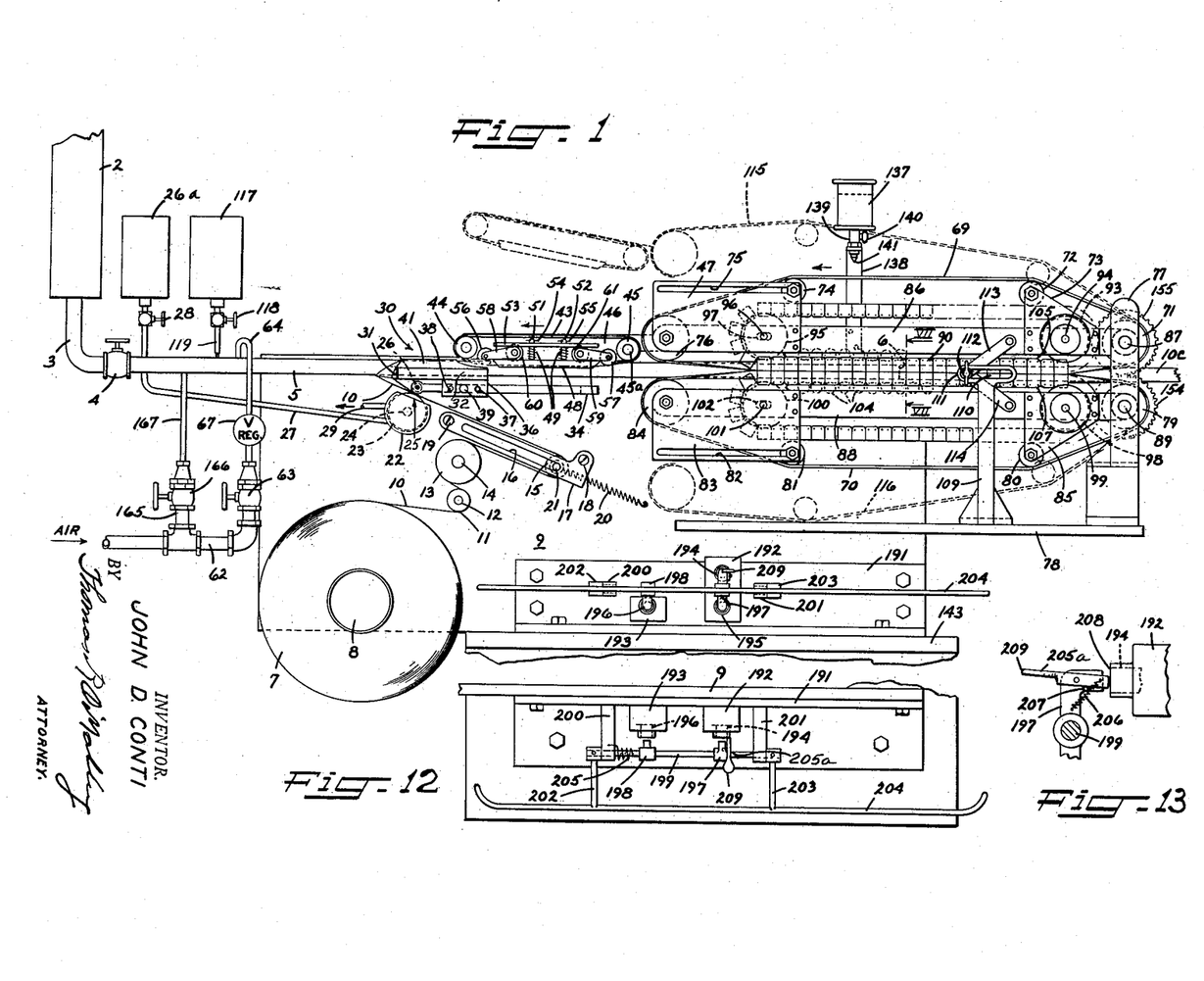
Figure 1 is a side elevation view of the entire apparatus.
Figure 12 is a plan view of the switch mechanism shown in Figure 1.
Figure 13 is an enlarged side elevation view of the switch holding or restraining mechanism.
Figures 2, 3, 5, 7, 8:
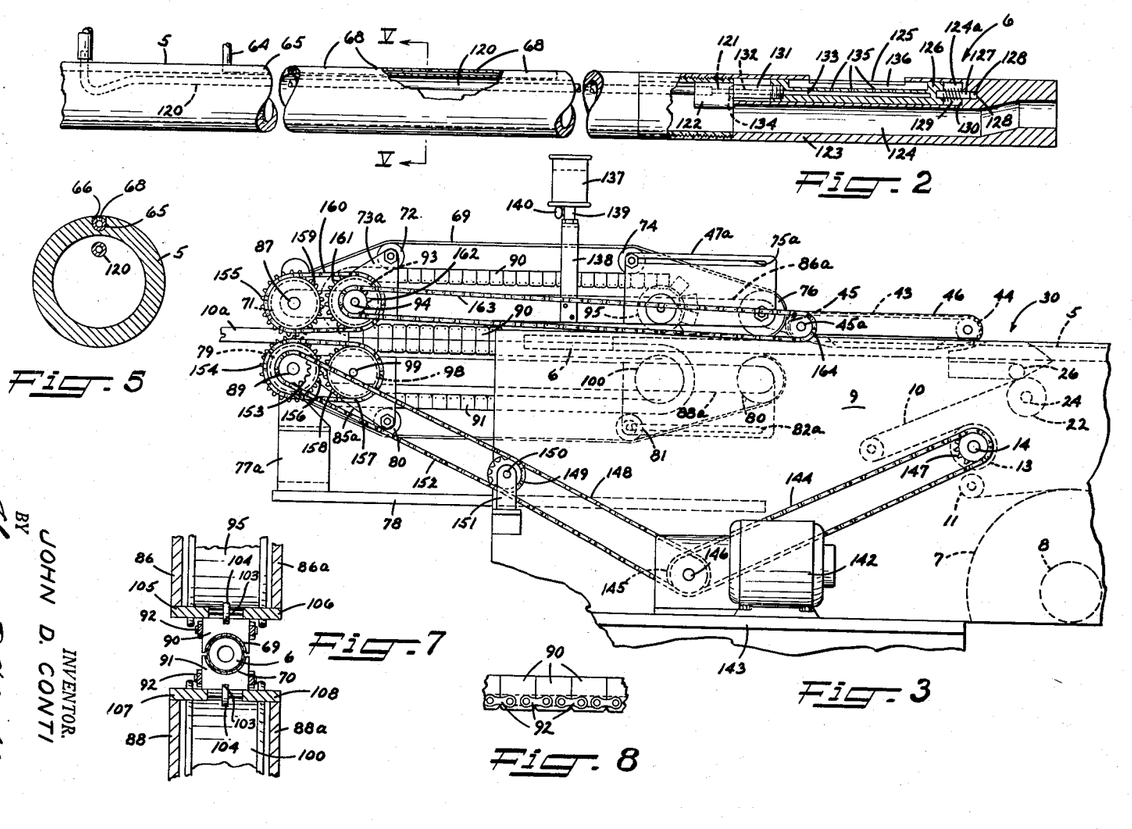
Figure 2 is a side elevation view, partly in section, of parts of the sausage meat feed tube on a large scale.
Figure 3 is a side elevation view of the apparatus showing the driving connections therefor.
Figure 5 is a view taken along the line V—V of Figure 2.
Figure 7 is a view taken along the line VII—VII of Figure 1.
Figure 8 is a side elevation view showing the means for connecting the blocks to form an endless chain or belt of the same.

Referring now to the drawing, which depicts illustrative embodiments of the invention, and in particular to Figure 1, the sausage or other plastic material is forced under pressure, such as air pressure, or by a screw feeding mechanism, and the like, from the storage tank 2 through conduit 3 and valve 4 into an elongated feed tube assembly 5 which in the preferred embodiment as seen in Figure 2 may be provided in an area adjacent the terminus of the tube, with a nozzle or tip 6 from which the stuffed material as well as treating fluids or liquids are discharged.

A roll of sheet material 7, for use in forming the casing, is rotatably mounted on the shaft 8 extending outwardly from the machine frame 9. The sheet material 10 passes under a guide roll 11 mounted on shaft 12 and then over a feed roll 13 mounted on shaft 14 which is driven as hereinafter described. The sheet material then passes around the tension roller 15 which is slidably mounted in the slot 16 in the bracket 17 which is in turn attached to machine frame 9 by bolts 18 and 19. There is, of course, a similar bracket, in which the other side of roller 15 is mounted, next to the machine frame and attached thereto by bolts 18 and 19. The sheet material, as it passes around roller 15, acts against the tension spring 20 which is attached between the machine frame 9 and shaft 21 on which roller 15 is mounted.

The sheet material 10 then passes to the adhesive applicator which in the illustrative embodiment shown in Figure 1 comprises a tank or container 22 having a roller 23 mounted therein on shaft 24 which is in turn mounted on the machine frame 9. The container 22 has an opening therein through which the roller 23 protrudes, as shown at 25. The sheet material passes between the roller 23 and the pressure roller 26 which is also mounted on a bracket 34 of the frame 9. Roller 23 is positioned in such manner that it contacts the sheet material 10 adjacent one edge thereof. Roller 23 is approximately half submerged in the adhesive material in container 22 and upon being rotated by the passage of the sheet material thereover, the adhesive material is transferred to the edge of the sheet. Any other comparable type of adhesive applicator may be employed if so desired, for example, a brush and fountain device may be employed.

The adhesive material is stored in the tank 26a and is fed by gravity, or a pump, etc. if desired, through the conduit or pipe 27 which may be made from any alkali resistant material. Saran tubing is satisfactory and in addition is flexible. A valve 28 is positioned in the line 27 so that the supply may be cut off when desired. An overflow pipe 29 is connected to the container 22. The excess adhesive material in container 22 runs through the overflow pipe to a pump and conduit (not shown) and is returned to tank 26a.

Figures 4, 6, 9, 10, 11:
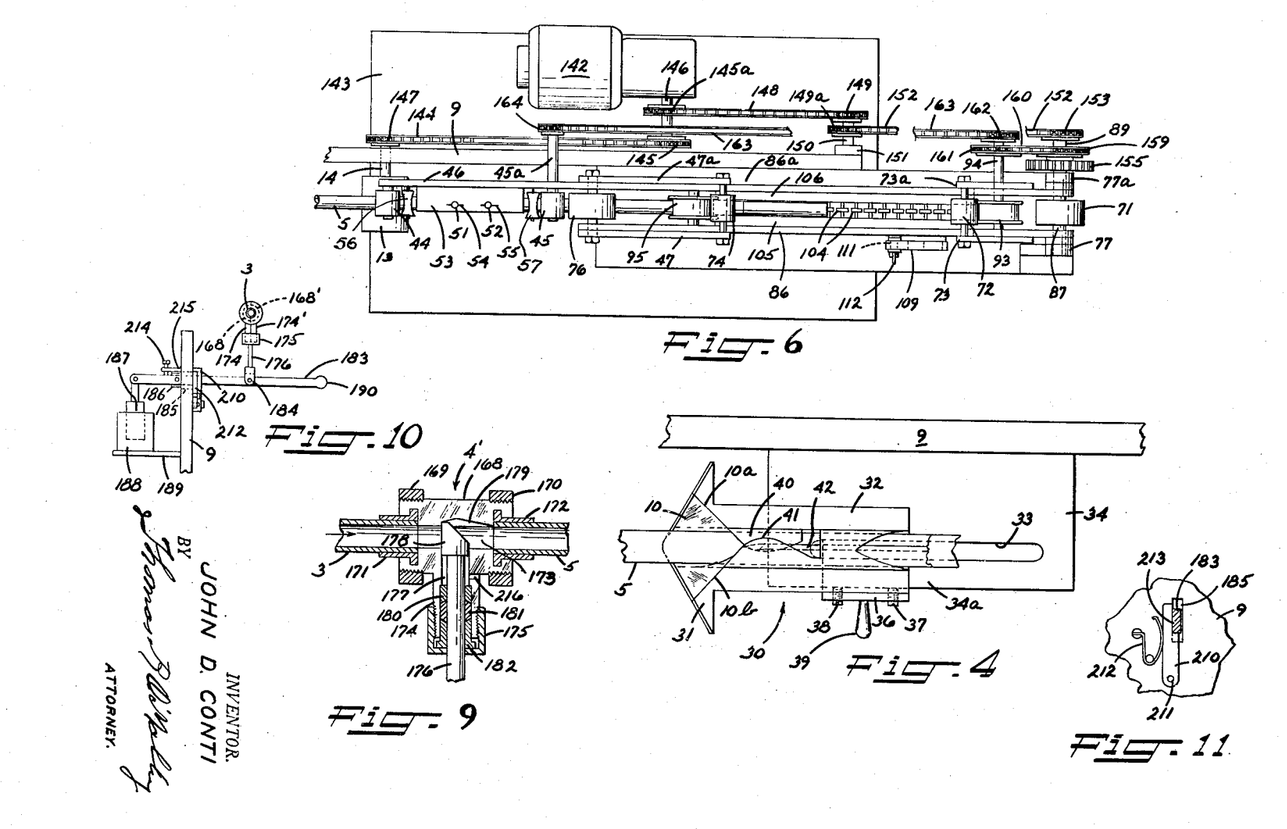
Figure 4 is a plan view of the casing forming device.
Figure 6 is a plan view of the stuffing portion of the apparatus showing the driving connections.
Figure 9 is a sectional view of a preferred type of valve that may be employed in the sausage meat feed tube.
Figure 10 is a diagrammatic end elevation view of the valve shown in Figure 9 and the means connected therewith for operating the valve.
Figure 11 is an enlarged view of the stop for holding the valve in Figure 9 in closed position.

After the adhesive material has been applied to the sheet it then passes to the casing former 30. The sheet first passes over the approximately V-shaped spreader guide 31 which is integrally attached to the base or main portion 32 of the former. Referring to Figure 4, the base 32 is slidably mounted in the slot 33 in the bracket 34 which extends outwardly from machine frame 9. The base 32 is mounted in slot 33 by a U-shaped keel portion having one side of the U extending downwardly from the base 32 through slot 33, the bottom of the U extending under the outer portion 34a of the bracket 34 (Fig. 4) and the other side of the U having a portion 35 extending upwardly in front of the outer face of the bracket 34. The casing former is held in place by means of the set screws 37 and 38 which extend through the portion 36 against the outer face of bracket 34. Also attached to the portion 36 of the casing former 30 is a handle 39 for moving the casing former along the slot 33 when the set screws 37 and 38 are loosened. Due to the sharp angle formed when the sheet material passes over the spreader guide 31, the casing former and guide are moved to the right, as viewed in Figure 1, when the machine is being threaded and then pushed back to the position shown at the start of operation. This adjustable feature also enables one to put any desired pressure on the sheet material by the spreader guide depending upon the tendency of the sheet material to fold or wrinkle and the amount of spreading action needed to overcome the same. Further, threading of the film through the casing former is greatly facilitated when the casing former is moved to the right as above described.

The sausage meat feed tube 5 fits in a grooved out portion on the top of the casing former but with sufficient clearance to allow the passage of the sheet material therebetween. The film or sheet 10 passes over the spreader guide 31 and under the sausage meat feed tube 5. Edge 10a of the sheet passes under the curved tongue-like member 40 against the tube 5. The edge 10b, along which the adhesive material has been placed, passes under the curved portion of the tongue-like member 41 which overlaps the member 40 but is a sufficient distance from the same to keep the adhesive from being rubbed off the sheet material by member 40 under which the edge 10a passes. The edge 10b overlaps edge 10a and when the latter passes from under the member 40, the edges come in overlapping contact, as shown at 42. The sheet is now in the shape of a hollow circular casing conforming in size to the tube 5 and wrapped thereabout and the edges 10a and 10b are in sealing position, i. e. in readiness to have pressure applied thereto.

After passing from under the tongue 41 the formed casing is picked up by the belt 43 which is driven by pulleys 44 and 45 and which rests against and conforms to the top of the tube 5. The pulleys are mounted on the bracket 46 which is attached to the bracket 47a (see Figure 6). The belt 43 is held tightly against the casing on the tube 5 by means of the curved metal shoe 48 which in turn is held down by the compression springs 49, 49. The springs are wrapped about the posts 51 and 52 which extend upwardly from the plate 48 through the plate 53 which is attached to and extends outwardly from bracket 46. The springs are positioned between the curved plate 48 and the plate or bracket 53. To counteract the force of the compression springs cotterpins 54 and 55 are passed through the top of posts 51 and 52.

In order to prevent the belt from wearing as it passes under the plate 48 and out from under the same, arcuate or grooved rollers 56 and 57 are positioned adjacent each end of the plate 48 and conform to the tube 5. The rollers 56 and 57 are mounted on brackets 58 and 59 respectively which in turn are mounted on posts 60 and 61 attached to the bracket 46. The rollers serve to lead the belt under the plate and lead it away from the same to prevent undue friction between the belt and leading and trailing edges of the plate.

In order to insure sufficient and even pressure between the belt 43 and the casing seam, air pressure is employed to press the casing against the belt. Referring to Figures 2 and 5 in addition to Figure 1, air is conducted to the sausage meat feed tube 5 through the main supply line 62, through valve 63 into the smaller pipe line 64 which in turn is connected to the small pipe 65 seated in the grooved opening 66 in the top portion of the wall of the sausage meat feed tube 5 (see Figure 5). A pressure regulating valve 67 is inserted in the line 64.

The pipe 65 extends under the belt 43 and that portion of the pipe under the belt has small openings 68 cut therein to allow the air to escape and press the casing seam, which is directly above the openings, against the belt thus insuring sufficient pressure to make a tight seal.

Referring to Figures 1 and 6, the now formed casing passes along the tube 5 when it comes into contact with the feed belts 69 and 70. Belt 69 is driven by pulley 71 and travels over the guide pulley 72 mounted on brackets 73 and 73a, over pulley 74, which is adjustably mounted in the slots 75 and 75a in brackets 47 and 47a, around pulley 76, along the tube 5 and back to pulley 71. Pulley 71 is mounted on the bracket 77 and 77a which in turn are mounted on the supporting member or bracket 78 attached to machine frame 9. By moving the pulley 74 to the left, as viewed in Figure 1, the belt 69 may be tightened which may be necessary after considerable use. The means for driving all the movable parts of the apparatus are shown in Figure 3 and will be described in connection therewith hereinafter.

The belt 70 is driven by pulley 79 and travels over the guide pulley 80 mounted on brackets 85 and 85a over the adjustably mounted pulley 81, which is mounted in slots 82 and 82a in brackets 83 and 83a, around the pulley 84, back to pulley 79. Pulley 79 is also mounted on brackets 77 and 77a. While all of the supporting brackets are not visible in Figure 1 and only a part of them visible in Figure 6, it should be understood that the apparatus has like supporting brackets positioned in like manner on the other side of the rollers and pulleys which they support and in each instance the like part has the same reference character followed by the letter "a."

Brackets 47, 47a and 73, 73a are mounted on the supporting frames 86 and 86a which in turn are pivotally mounted on the shaft 87 extending between brackets 77 and 77a, which shaft also carries the pulley 71. Brackets 83, 83a and 85, 85a are mounted on the supporting frames 88 and 88a which in turn are pivotally mounted on the shaft 89 extending between brackets 77 and 77a, which shaft also carries pulley 79.

The belts 69 and 70, in addition to their feeding action also help to hold the casing tightly about the tube 5 and also help to maintain the desired shape of the stuffed product after it passes beyond the end of tube 5 and/or nozzle 6. In order to hold the belts around the tube and/or nozzle and then around the stuffed sausage, there is provided two chains of blocks 90 and 91 arranged in endless belt-like fashion. There are a series of these blocks for each belt. The blocks are held together by the links 92 (see Figure 3). The opposed faces of the blocks are arcuate in shape or grooved out, as shown in Figure 7, so that they fit approximately half-way around the tube 5 and conform to the size of the finished product. The blocks 90 are arranged in belt-like fashion around the pulley 93 mounted on shaft 94 attached between the supporting frames 86 and 86a, and the pulley 95 mounted on shaft 96 which in turn is mounted adjustably in the slots 97 and 97a in the supporting frames 86 and 86a. The pulley 95 is adjustable in order to loosen or tighten the belt of blocks as desired. The blocks 91 are likewise arranged in belt-like fashion around the pulleys 98 mounted on shaft 99 attached between the supporting frames 88 and 88a, and the pulley 100 mounted on shaft 101 which is mounted adjustably in the slots 102 and 102a in the supporting frames 88 and 88a. The pulley 100 is adjustable in the same manner as is pulley 95.

The pulleys 93, 95, 98 and 100 are flanged as shown in Figure 7 in order to keep the blocks from moving from side to side as they pass thereover.

In order to hold the blocks 90 and 91 close together and to keep them from separating due to the pressure of the sausage emerging from tube 5 and/or nozzle 6, the blocks have a groove 103 cut in their back faces underside (see Figure 7) which acts as a track for the wheels 104 over which the blocks ride. The upper set of wheels 104 are mounted between spaced bars 105 and 106 attached to the bottom of the supporting frame 86 and 86a and frames 107 and 108 attached to the top of supporting frames 88 and 88a.

At the start of operations in order to thread the apparatus and get the casing through the apparatus beyond the tube, the blocks and belts are moved away from the tube by pivoting the supporting frames 86, 86a and 88, 88a which also raises the belt 44 from the tube 5 since the supporting bracket for the same is attached to the bracket 47a. The mechanism for pivoting the blocks and belts is shown in Figures 1 and 6 and comprises the supporting bracket or frame 109 which is attached to and supported by the bracket or frame 78. The bracket 109 has an elongated horizontal slot 110 in the upper portion thereof. Mounted in the slot 110 is a bolt 111 having a wing-nut 112 on one end thereof. The bolt also passes through the ends of links 113 and 114, link 113 being pivotally fastened at its other end to the supporting frame 86 and link 114 being pivotally fastened at its other end to the supporting frame 88. As viewed in Figure 1, the wing-nut and bolt are secured in the left-hand side of slot 110 which is the closed position, i. e. the belts and blocks are against the casing. By loosening the wing-nut 112 and sliding the bolt 111 to the right, the belts and blocks are moved away from the casing to the dotted line positions 115 and 116 by the action of links 113 and 114, the supporting frames 86, 86a and 88, 88a pivoting on shafts 87 and 89 respectively. While the means for removing the belts and blocks from the casing just described is one of the preferred mechanisms, any other suitable means which will serve the same purpose may be employed.

When the adhesive material employed in forming the casing contains a strong alkali, it is desirable in many cases to neutralize the excess alkali present on the casing seam in order to guard against any possible injurious effects in the finished product. For this purpose the seam may be brought into contact with an aqueous solution of an acid which when reacted with an alkali, such as sodium hydroxide, will form a non-injurious salt therewith. It is preferred to employ an aqueous solution of acetic acid, but any other similar acid may be employed if desired, such as citric, tartaric, etc.

Referring to Figures 1 and 2, the acetic or other acid is brought in contact with the casing seam as follows: the aqueous acid solution is stored in a tank 117 and flows therefrom through the valve 118 and line 119 which is connected to the small bore pipe line 120 in tube 5. The line 120 is positioned in the upper part of sausage meat feed tube 5 (see Figure 5). However, the line 120 may be formed as a bore in the wall of tube 5 if desired. The line 120 terminates in the block 122 in the end of tube 5 and communicates with the bore 121 through the block 122.

The discharge terminus of tube 5 is provided with the nozzle assembly 6 which may be detachably connected to the tube. As shown in Figure 2, the nozzle assembly comprises a sleeve 123 having a bore 124 therein for the passage of sausage or like material therethrough, the bore 124 being aligned with the opening in the end of tube 5. The sleeve 123 has a longitudinally extending bore 124a in the upper portion thereof and an elongated slot or opening 125 in the top of sleeve 123 communicates with the bore 124a. The sealed edges of the casing passes over the opening 125. Into the opening 124a, there is inserted the block 126 before the nozzle 6 is attached to tube 5. Attached to the leading end of block 126 is a peg or pin 127 which, when the block is inserted into the opening 124, fits into the hole 128 in the sleeve 123. A compression spring 129 is placed over the peg 127 before insertion into opening 124 so that it abuts the face or wall 130 of sleeve 123. The trailing end of block 126 has a nipple or adaptor 131 screwed therein. The nipple has a small bore 132 therein which corresponds in size to the small bore 121 in the block 122 and connects the same with the small bore 133 in the block 126. When the sleeve 123 is attached to tube 5, the nipple 131 seats in the block 122 as shown at 134 and is held tightly therein by the action of the compression spring 129. The portion of the block 126 above the bore 133 has small openings 135 cut therein which connect the bore 133 with the chamber or reservoir 136 in the upper part of the block 126. The slot 125 in the sleeve 123 opens into the chamber 136.

Thus, the acetic acid in tank 117 is fed by gravity or pumped if desired through line 119, line 120, through the bore 121, nipple 131, bore 133, through the openings 135 into the reservoir 136 where it comes in contact with the underside of the casing seam as the same passes over the opening 125. If desired, the reservoir or chamber 136 may be packed with an absorbent material such as sponge, cotton, etc. The valve 118 and the packing of the chamber 136 serve as means to regulate the flow of acid through the opening 125.

In order to deposit acetic acid or the like on the top surface of the casing seam, there is employed a container 137 positioned above the upper belt 69 on the bracket 138 which in turn is fastened to the supporting frame 86a (see Figure 3). The acid passes from the container 137 through the line 139, valve 140 and drips from the fitting 141 onto the belt 69 which in turn carries the acid into contact with the upper surface of the casing seam. The valve 140 provides a means of regulating the amount of acid transferred to the belt 69. If desired, the means for putting acid on the top of the casing seam may be eliminated since the acid applied to the under-side of the seam may be sufficient if the same penetrates the casing seam rapidly enough.

Referring to Figures 3 and 6, the apparatus is driven in the following manner: A motor 142 mounted on support 143, to which machine frame 9 is also attached, drives the entire apparatus.

A chain 144 is connected between the sprocket 145 on the motor shaft 146 and the sprocket 147 on shaft 14 which carries the sheet material feed roller 13, thus driving the sheet material feed roller. Chain 148 is connected between sprocket 145a on the motor shaft 146 and the sprocket 149 mounted on shaft 150 which in turn is supported by machine frame 9 and the bracket 151 mounted on the machine frame 9. A chain 152 is connected between sprocket 149a on shaft 150 and the sprocket 153 on shaft 89 which carries the lower belt driving roll or pulley 79. There is a gear 154 on shaft 89 which is in mesh with gear 155 on shaft 87 which drives pulley or roller 71 in turn driving belt 69.

A sprocket 156 is mounted on shaft 89 which is connected by chain 157 to the sprocket 158 on shaft 99 which carries the flanged roller 98 which drives the blocks 81. A sprocket 159 is mounted on shaft 87 which is connected by chain 160 to the sprocket 161 on shaft 94 which carries the flanged roller or pulley 93 thus driving the blocks 99. Also mounted on shaft 94 is a sprocket 162 which is connected by chain 163 to the sprocket 164 on shaft 45a which carries roller 45 thus driving belt 43. Thus, by means of the entire chain and sprocket assembly and the enmeshed gears just described, the entire apparatus is driven by one motor.

Referring to Figures 9 and 10, there is shown a preferred type of valve 4', which is automatically operated, to be employed in place of the valve 4 on the sausage meat feed tube 5. The valve comprises two arcuate (or semi-cylindrical) members or blocks 168 and 168' which are held together by means of the rings 169 and 170 which screw onto the threaded ends thereof. Before the rings are attached, however, the arcuate blocks are fitted around the sleeves or nipples 171 and 172 which are integrally attached to the ends of the conduit 3 and tube 5 respectively. The passage 173 within the assembled blocks 168 and 168' coincides with the openings or passages in conduits 3 and 5.

Extending downwardly from the blocks 168 and 168' and formed integrally therewith or welded thereto are arcuate (or semi-cylindrical) members 174 and 174' which are held together by the cap 175 screwed thereupon. Extending through an opening in the cap 175 is a rod or shaft 176 which passes through the opening 177 formed by members 174 and 174' and terminates in the plug 178 which, when the rod 176 is pushed upward, as hereinafter described, extends through the passage or opening 173 into the recess 179 formed by the blocks 168 and 168'. About the shaft 176 in the opening 177 are placed a packing gland 180, packing 181 and another packing gland 182.

Referring in particular to Figure 10, the rod 176 is pivotally attached to or mounted on the lever 183 by the yoke 184. The lever 183 extends through the opening 185 in the machine frame 9 and is pivotally mounted on the bracket 186 attached to the machine frame 9. The lever is pivotally attached at one end to the rod 187 of solenoid 188 which in turn is mounted on the supporting member 189 extending out from the frame 9. The other end of lever 183 may be enlarged in the form of a ball 190 so that it is easily grasped with the hand.

The valve 4' is operated in conjunction with the starting and stopping of the motor 142 and the mechanism for doing so is shown in Figures 1, 12 and 13. Mounted on the bracket 191 which supports frame 9 are two switch boxes 192 and 193. Switch box 192 is connected to motor 142 and is of the two button type having a start button 194 and a stop button 195 thereon, which buttons work independently of each other. The switch box 193 is connected to solenoid 188 and has only one button 196 thereon which is of the spring variety, i. e. the switch closed thereby returns to normal open position by the action of a spring when released after having been pressed inwardly to close the switch in the circuit.

The switches 192 and 193 are actuated by the rocker arms 197 and 198 respectively which are rigidly mounted on the rotatable shaft 199 which in turn is supported by the brackets 200 and 201 extending outwardly from the supporting bracket 191. Rigidly attached to the ends of shaft 199 are the arms 202 and 203 which support the elongated rod 204. The rod 204 is continually forced upward by reason of the action of spring 205 about shaft 199 and attached to the shaft 199 and bracket 200. The elongated rod is employed so that the switches may be readily and easily operated by an operator in any location along the machine when an emergency arises.

When the rod 204 is pressed downward, the rocker arms are rotated against the switch buttons 195 and 196. The motor 142 is thereby cut off stopping the machine and the button 196 closes the circuit to the solenoid 188 thus energizing the same and closing the valve 4' stopping the feed of stuffing material. Upon releasing the rod 204, the same swings upward due to the action of spring 205 and in order to prevent the rocker arm 197 from pressing the motor starting switch 194, there is provided a lever 205a pivotally mounted on the side of rocker arm 197 (Figure 13). The lever 205a is continually forced in a clockwise direction (as viewed in Fig. 13) by means of the spring 206 fastened between lever 205a and rocker arm 197. The detent 207 extending outwardly from the rocker arm prevents the further rotation of lever 205a. When the rocker arm comes back toward the switch button 194, the lever 205a contacts the metal casing 208 around the button and prevents the rocker arm from contacting the button. When it is desired to again start the motor, the lever 205a is pressed down at 209 swinging it in a counter-clockwise direction and out of contact with casing 208 thus allowing rocker arm 197 to contact the motor starting button 194.

When the solenoid 188 is energized, bar 187 is pulled downward thus rotating the lever 183, pushing rod 176 upward and forcing the plug 178 into the opening 173 in the valve closing the same. Although the solenoid is immediately deenergized, the valve will remain in closed position due to the holding means shown in Figure 11 which comprises a lever 210 pivotally fastened to frame 9 at 211. The lever 210 is constantly forced against lever 183 due to the action of spring 212. When lever 183 is raised up closing valve 4', the cut-out portion 213 of lever 210 prevents the downward movement of lever 183 thus maintaining the valve in closed position. When it is desired to restart the machine, the valve is opened by hand, that is lever 210 is pushed to the left as viewed in Figure 11 and lever 183 is pressed downward by grasping handle 190. If it is desired to regulate the size of the valve opening to control the amount of stuffing material passing therethrough, there is provided a screw 214 which passes through a bracket 215 extending outward from frame 9 (Figure 10). By adjusting screw 214, the clockwise rotation of lever 183 is reguated.

Referring to Figure 9, since some of the stuffing material may get behind plug 178 in the opening 177 and eventually hinder the efficient operation of the valve, there is provided an opening 216 through which the stuffing material in opening 177 will be forced when the plug 178 is moved downward.

Numerous advantages of the valve and switch mechanism just described will be obvious to those skilled in the art.

At the start of operations in order to test the casing, i. e. test the seal on the same to make certain sufficient adhesive has been applied, etc., and to determine whether or not any additional adjustments are necessary, air is blown into the formed casing after the end emerging from the apparatus has been tied. This is accomplished by directing air into the sausage meat feed tube 5 through the line 165 connected to the main air line 62, through the valve 166 and line 167 which is connected to the tube 5. After the casing has been tested and the seal is found to be satisfactory, the valve 166 is closed and valve 4 is opened allowing the sausage meat or other plastic material to enter the tube 5, pass through sleeve 123 and enter the casing. The belts 69 and 70 in combination with the blocks 90 and 91 fitting thereover insure a sausage of uniform size and prevent any wrinkles or bulges in the same which might be caused by slight variations in pressure and in addition, at the same time, serve to carry the stuffed products along to the next operation, if any.

As previously pointed out, one of the important characteristic features of the present invention is the endless belt of blocks, each of which is curved to fit the sausage meat feed tube. The blocks serve to hold the belts tightly against the casing and carry the same through the apparatus. More important, however, is the fact that the blocks serve as a pressure barrier and mold at the discharge terminus of the tube, which is the point of greatest pressure, thus insuring the continuous production of a uniform stuffed product free from bulges, wrinkles, and the like, and in addition, eliminating the danger of breakage of the casing wall and seal.

That portion of the apparatus comprising the endless belts and blocks may be employed in conjunction with any type of stuffing apparatus in which the casing is formed from a sheet material and stuffed simultaneously with the formation thereof. Also, by use of the endless belt of blocks, it is possible to increase the production greatly over that without the use of the blocks because the blocks, in addition to assisting in the feeding of the stuffed product, serve as a barrier or support at the point of greatest pressure thus preventing bursting of the casing. For example, when producing a stuffed sausage approximately one inch in diameter, the apparatus of the present invention may be operated at a speed such as to produce 75 feet of sausage per minute or more.

Another important feature of the invention is the provision of means for testing the seal on the newly formed casing at the start of operations. This enables one to determine whether or not the adhesive material is of the right concentration, whether the same is being applied to the sheet material in proper fashion and in the correct amount, etc.

While the apparatus of the present invention, as shown and described herein, produce a continuous stuffed product, it is easily adaptable for use with other apparatus, such as linking devices, and the like. For example, the continuous filled casing 10c (see Figure 1) could proceed to a linking device, then to cooking, smoking and cooling chambers, from whence the stuffed linked products could proceed to a stripper, when it is desired to produce such products as skinless frankfurters or wieners, and the like. As an example of such a setup, see my pending application Serial No. 139,830.

It should be noted that the sheet or web of casing material may contain reinforcing fibers. For example, a multiplicity of loose natural or artificial short fibers may be dispersed in a solution of the alkali-soluble, water-insoluble cellulose material and the solution formed into a web. Alternatively, a thin tissue paper formed of natural or artificial fibers may be impregnated and coated with a solution of the alkali-soluble, water-insoluble cellulosic material which is coagulated by treatment with an acid, washed and dried. The presence of the loose fibers or of the tissue paper does not interfere with the sealing of the sheet material by the alkaline adhesive. The coatings containing fibers are stronger, less expansible and more opaque. Therefore, such fibrous casings are especially adapted for liver sausage and the like.

While for the most part, for purposes of description, reference has been made to the preparation of sausage, it is to be understood that the invention is not limited to such stuffed products but is equally advantageous for the continuous production of encased stuffed products of plastic nature, such as ice cream, fats, scrapple and other meat products, as well as cheese, lard, oleomargarine, greases, snuff, caulking compound, and other products normally stuffed into casings, and in the appended claims, the expression "stuffed products" is intended to include all such products.

The present apparatus has numerous advantages in the production of both frankfurters and large size sausages, it being understood, of course, that the sausage meat feed tube and the various parts fitting thereabout, may be varied in size depending upon the size of the finished stuffed product desired. The size of the sheet material used for forming the casing would be varied accordingly. The apparatus provides for continuous production which results in substantial economies in manufacture, reduces labor requirements and increases the output per machine. As the casings are always uniform in diameter, the product is more uniform than when individual casings are stuffed according to prior practice. Further, since the present apparatus produces a casing from a flat sheet, the sheet may be printed with an all-over design extending to the edges, thus permitting the design in the finished stuffed sausage to extend completely around the sausage. The use of a flat sheet also permits economies in moistureproofing or otherwise coating the sheet material before its formation into a casing. Moreover, when the casing is formed from an alkali-soluble cellulose ether sheet material and utilized in the manufacture of so-called "skinless" frankfurters, the stripped casings may be cleaned, redissolved and recast into sheet material for the further production of casing. This reuse of the stripped casing is not possible with the regenerated cellulose casings heretofore used in the manufacture of "skinless" frankfurters because it is not practical to redissolve regenerated cellulose for the formation of additional viscose casing owing to the chemical degradation which occurs when such films are rexanthated. Numerous other advantages of the present invention will be obvious to those skilled in the art.

It is to be understood that the foregoing description is merely illustrative and that changes and variations may be made without departing from the spirit and scope of the invention as defined in the appended claims.

I claim:

1. In an apparatus for the continuous production of stuffed products, the combination of a stuffing tube, conduit means connected to the tube for conveying a plastic stuffing material thereto, means for shaping a strip of sheet material into a casing about said tube, means for sealing the longitudinal edges of the strip of sheet material to form a longitudinal seam on the casing, feeding means adjacent the tube for drawing the sheet through the shaping and sealing means and for feeding the casing over the tube towards the discharge opening thereof, molding means adjacent said discharge opening of the tube comprising a pair of endless moving belts disposed with the opposed courses thereof extending partially adjacent opposite sides of the tube and partially beyond the discharge opening of the tube, and means for urging said courses against the casing comprising two series of moving blocks each mounted in endless belt-like fashion and having a course moving in contiguity with one of the first-mentioned belt courses, and means for continuously moving the opposed courses of belts and the contiguous courses of blocks away from the discharge opening of the tube.

2. In an apparatus for the continuous production of stuffed products, the combination of a stuffing tube, conduit means connected to the tube for conveying a plastic stuffing material thereto, shaping means adjacent the tube having guiding portions spaced from and around the tube to permit continuous passage of a sheet of flexible material between said portions and the tube for folding the passing sheet about the tube with its edges overlapped in the form of a hollow casing, means for sealing the overlapped longitudinal edges of the strip of sheet material to form a longitudinal seam on the casing, feeding means adjacent the tube for drawing the sheet through the shaping and sealing means and for feeding the casing over the tube towards the discharge opening thereof, molding means adjacent the discharge opening of the tube comprising a pair of endless moving belts disposed with the opposed courses thereof extending partially adjacent opposite sides of the tube and partially beyond the discharge opening of the tube, and means for urging said courses against the casing comprising two series of moving blocks each mounted in endless belt-like fashion and having a course moving in contiguity with one of the first-mentioned belt courses, and means for continuously moving the opposed courses of belts and the contiguous courses of blocks away from the discharge opening of the tube.

3. In an apparatus for the continuous production of stuffed products, the combination of a stuffing tube, conduit means connected to the tube for conveying a plastic stuffing material thereto, shaping means adjacent the tube having guiding portions spaced from and around the tube to permit continuous passage of a sheet of flexible material between said portions and the tube for folding the passing sheet about the tube with its edges overlapped in the form of a hollow casing, means for sealing the overlapped longitudinal edges of the strip of sheet material to form a longitudinal seam on the casing, feeding means adjacent the tube for drawing the sheet through the shaping and sealing means and for feeding the casing over the same, molding and feeding means adjacent the discharge opening of the tube, means for continuously moving said molding means away from the discharge opening of the tube, a pipe extending along the wall of of the tube for applying a liquid to the inside of the sealed seam, and means for applying a liquid to the feeding means for transference to the outside of the sealed seam.

4. In an apparatus for the continuous production of stuffed products, the combination of a stuffing tube, conduit means connected to the tube for conveying a plastic stuffing material thereto, means for shaping a strip of sheet material into a casing about said tube, means for sealing the longitudinal edges of the strip of sheet material to form a casing around the tube, feeding means adjacent the tube for feeding the casing over the same, molding means adjacent the discharge opening of the tube comprising a pair of endless moving belts disposed with the opposed courses thereof extending partially adjacent opposite sides of the tube and partially beyond the discharge opening of the tube, and means for urging said courses against the casing comprising two series of moving blocks each mounted in endless belt-like fashion and having a course moving in contiguity with one of the first-mentioned belt courses, a fixed supporting member, separate supporting means for each of the belts and its associated series of blocks, and each of said supporting means being pivotally mounted on the fixed supporting member, means for swinging each of the supporting means with the molding means toward and away from operative position adjacent the tube, and means for continuously moving the opposed courses of belts and the contiguous courses of blocks away from the discharge opening of the tube when the molding means is in operative position.

5. An apparatus for the continuous production of stuffed products as defined in claim 4 wherein the blocks of each series are linked together to form an endless chain and have a grooved surface in contact with the belt and the molding means comprises fixed track means for holding the blocks and belt against the tube and about the stuffed product emerging from the discharge opening of the tube.

6. An apparatus for the continuous production of stuffed products as defined in claim 5 having a pipe extending along the wall of the tube for applying a liquid to the inside of the sealed edges and means for applying a liquid to the second feeding means for transference to the outside of the sealed edges.

7. An apparatus for the continuous production of stuffed products as defined in claim 6 comprising a pipe extending along the wall of the tube for conducting air against the inside of the sealed casing edges at a point beyond the feeding means.

8. In an apparatus for the continuous production of stuffed products, the combination of a stuffing tube, means connected to the tube for conveying a plastic stuffing material thereto, means for shaping a sheet material into a casing around said tube, means for sealing the longitudinal edges of the sheet material to form a longitudinal seam on said casing comprising casing feeding means adjacent the tube between the shaping means and the tube, and a pipe extending along the wall of the tube having discharge openings adjacent the feeding means for conducting air against the inside of the casing seam at a point opposite the feeding means.

9. A machine for continuously packaging a plastic material in a tubular casing comprising a stationary discharge tube through which plastic material to be packed is forced under pressure, a supply of sheet material adjacent said tube, means for feeding said sheet material from the supply around the tube in overlapped edge relationship, an endless belt resiliently urged against the overlapped edges of the sheet material and the tube, said belt being positioned contiguous to the sheet material feeding means, means on the interior of the tube adjacent the belt for exerting a counterpressure against the belt to effect compression and sealing of the overlapped seam, a pair of endless belts each having a span in alignment with the tube and extending from a point overlapping the tube to a point beyond the terminus thereof, means operatively associated with said belts for shaping the courses of the belts to substantially the configuration of the terminus of the tube, and means for turning the belts to move the respective courses thereof away from the terminus of the tube.

10. Apparatus as defined in claim 9 having means for displacing the belts from an operative position adjacent the tube to an inoperative starting positon substantially removed from the tube.

11. In an apparatus for the continuous production of stuffed products, the combination of a stuffing tube, conduit means connected to the tube for conveying a plastic stuffing material thereto, means for applying an adhesive to one edge of a strip of sheet material, means for shaping said strip of sheet material into a casing about said stuffing tube, means for sealing the longitudinal edges of the strip of sheet material to form a casing around the stuffing tube, feeding means adjacent the stuffing tube for feeding the casing over the same, molding and feeding means for the stuffed casing adjacent the discharge opening of the tube, means for continuously moving said molding means away from the discharge opening of the tube, a pipe line extending along the wall of the stuffing tube for applying a liquid to the inside of the sealed edges of sheet material, and means for applying the liquid to the feeding means for transference to the outside of said sealed edges.

12. In an apparatus for the continuous production of stuffed products, the combination of a stuffing tube, conduit means connected to the tube for conveying a plastic stuffing material thereto, means for holding a roll of sheet material, means for applying an adhesive to one longitudinal edge of the sheet material, means for shaping the sheet material into a casing around said stuffing tube, an endless pressure belt for sealing the longitudinal edges of the sheet material against the tube, a pipe extending along the wall of the stuffing tube for conducting air against the inside of the casing edges, feeding means adjacent the stuffing tube for feeding the casing over the same, molding and feeding means adjacent the discharge opening of the tube, and means for continuously moving said molding means away from the discharge opening of the tube.

13. In an apparatus for the continuous production of stuffed products, the combination of a stuffing tube, conduit means connected to the tube for conveying a plastic stuffing material thereto, means for holding a roll of sheet material, means for applying an adhesive to one longitudinal edge of the sheet material, means for shaping the sheet material into a casing about said stuffing tube, an endless pressure belt for sealing the longitudinal edges of the sheet material to form a seam against the tube, a pipe extending along the wall of the stuffing tube for conducting air against the inside of the casing seam, feeding means adjacent the stuffing tube for feeding the casing over the same, molding and feeding means adjacent the discharge opening of the tube, means for continuously moving said molding means away from the discharge opening of the tube, a second pipe extending along the wall of the stuffing tube for applying a liquid to the inside of the sealed seam, and means for applying a liquid to the feeding means.

14. In an apparatus for the continuous production of stuffed products, the combination of a stuffing tube, conduit means connected to the tube for conveying a plastic stuffing material thereto, solenoid actuated valve means in the stuffing tube, means for shaping a strip of sheet material into a casing about said stuffing tube, means for sealing the longitudinal edges of the strip of sheet material to form a seam along the stuffing tube, feeding means adjacent the stuffing tube for feeding the casing over the same, molding means adjacent the discharge opening of the tube, means for continuously moving said molding means away from the discharge opening of the tube, electric means for driving the feeding and moving means, and switch means for simultaneously actuating the electric means and the solenoid whereby the valve means is closed when the apparatus is stopped.

15. In an apparatus for the continuous production of stuffed products, the combination of a stuffing tube, conduit means connected to the tube for conveying a plastic stuffing material thereto, means for shaping a strip of sheet material into a casing about said tube, means for sealing the longitudinal edges of the strip of sheet material around the tube, feeding means adjacent the tube for feeding the casing over the same, molding and feeding means adjacent the discharge opening of the tube, means for continuously moving said molding means away from the discharge opening of the tube, and a pipe extending along the wall of the tube and having discharge openings in the peripheral wall of the tube spaced from its discharge opening for applying a liquid to the inside of the sealed longitudinal edges.

References Cited in the file of this patent

UNITED STATES PATENTS

| Number | Name | Date |
|---|---|---|
| 1,484,741 | Schonland, Jr. | Feb. 26, 1924 |
| 2,006,375 | Vogt | July 2, 1935 |
| 2,006,376 | Vogt | July 2, 1935 |
| 2,134,862 | Dunham | Nov. 1, 1938 |
| 2,156,466 | Vogt | May 2, 1939 |
| 2,280,405 | Frostod | Apr. 21, 1942 |
| 2,435,347 | Gilman | Feb. 3, 1948 |